United States Patent [19]

Burnett

[11] Patent Number: 5,703,875
[45] Date of Patent: Dec. 30, 1997

[54] INTEGRATED CONTROL AND DATA MESSAGE NETWORK

[75] Inventor: Robert W. Burnett, Torrance, Calif.

[73] Assignee: Hughes Electronics, Los Angeles, Calif.

[21] Appl. No.: 630,567

[22] Filed: Apr. 10, 1996

[51] Int. Cl.[6] .................................................. H04L 12/56
[52] U.S. Cl. ............................................ 370/381; 370/412
[58] Field of Search .................................... 370/229, 230, 370/235, 395, 396, 412, 413, 414, 415, 416, 417, 418, 419, 421, 360, 377, 378, 381, 382–385, 389, 392, 393, 428, 535, 536, 537, 902, 905, 908, 912, 916

[56] References Cited

U.S. PATENT DOCUMENTS 4,603,416  7/1986  Servel et al. ............................ 370/412
4,910,731  3/1990  Sukurai et al. .......................... 370/412
4,947,388  8/1990  Kuwahara et al. ...................... 370/412

*Primary Examiner*—Dang Ton
*Attorney, Agent, or Firm*—Leonard A. Alkov; Wanda K. Denson-Low

[57] ABSTRACT

A switch for communicating short control messages and longer data messages. The control and data switch comprises separate resources for control messages and for data messages, while sharing communication links. Each input port of the switch has a separate control message input FIFO buffer and a data message input FIFO buffer. These buffers allow a control message to preempt a data message that is currently in progress over a link. If there are control message words waiting to be transmitted over the link, they are given prior over any data message words that are ready for transmission over the same link. Preemption of an ongoing data message by a control message takes place without disrupting the data message, other than delaying it.

4 Claims, 1 Drawing Sheet

INTEGRATED CONTROL AND DATA MESSAGE NETWORK

BACKGROUND

The present invention relates generally to digital intercommunication networks, and more particularly, to an improved control and data message network.

In a high performance parallel processor constructed from a large number of computing nodes, such as nodes based on microprocessors for example, the nodes typically receive data and communicate with each other through a network comprised of many links connected through a set of switches. A switch provides a crossbar that can route any input link to any output link connected to that switch. Existing network approaches are designed primarily to transmit data messages. The latency in sending control messages using conventional network approaches is too high.

In a real-time embedded processing system, a capability is needed for immediately passing a control message (command or status) across the network even if some of the links along the message path are currently busy transmitting data messages. These links may be engaged in transmitting a long data message, so waiting for the current message to complete is undesirable if the control message is urgent.

Accordingly, it is an objective of the present invention to provide for an improved control and data message network.

SUMMARY OF THE INVENTION

To meet the above and other objectives, the present invention provides for a network or switch that is used for communicating both short control messages and longer data messages. Data messages include input data from sensors and output data from processors, for example, as well as intermediate computational results derived from the processors.

A simple and relatively inexpensive approach to implementing a combined control and data network is provided by the present invention which provides separate resources within the switch for control messages and for data messages, while sharing communication links. Each input port of the switch has a separate input FIFO buffer for control messages and an input FIFO buffer for data messages. This allows a control message to preempt a data message that is currently in progress over a link. If there are control message words waiting to be transmitted over the link, they are given priority over any data message words that are ready for transmission over the same link. Preemption of an ongoing data message by a control message takes place without disrupting the data message, other than delaying it. For example, there is no need to abort the data message.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
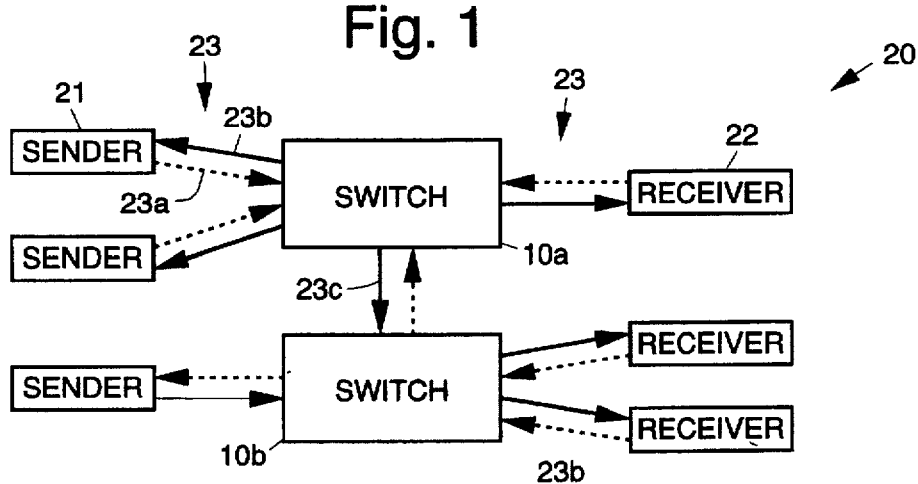
FIG. 1 shows a typical processing node implemented using the present invention.

Referring to the drawing figures, FIG. 1 shows a typical processing system 20 implemented using a switch 10 in accordance with the present invention. The processing system 20 is typically comprised of a plurality of computer processors and data sensors, and the like, that each send and receive control and data words to and from other processors or sensors that are part of the processing system 20. Thus, certain processors and sensors act as senders 21 of data and control words at certain times, and other processors and sensors act as receivers 22 of transmitted data and control words.

Thus, for the purposes of explanation, in the processing system 20, a plurality of senders 21 are coupled to a plurality of receivers 22 by way of a plurality of switches 10a, 10b made in accordance with the principles of the present invention. Links 23 between the respective various intercommunicating elements are unidirectional. In general, the processing system 20 needs an input link 23a and an output link 23b. Flow control is supported by a control line (not shown) formed as part of each of the links 23b.

Figure 2:
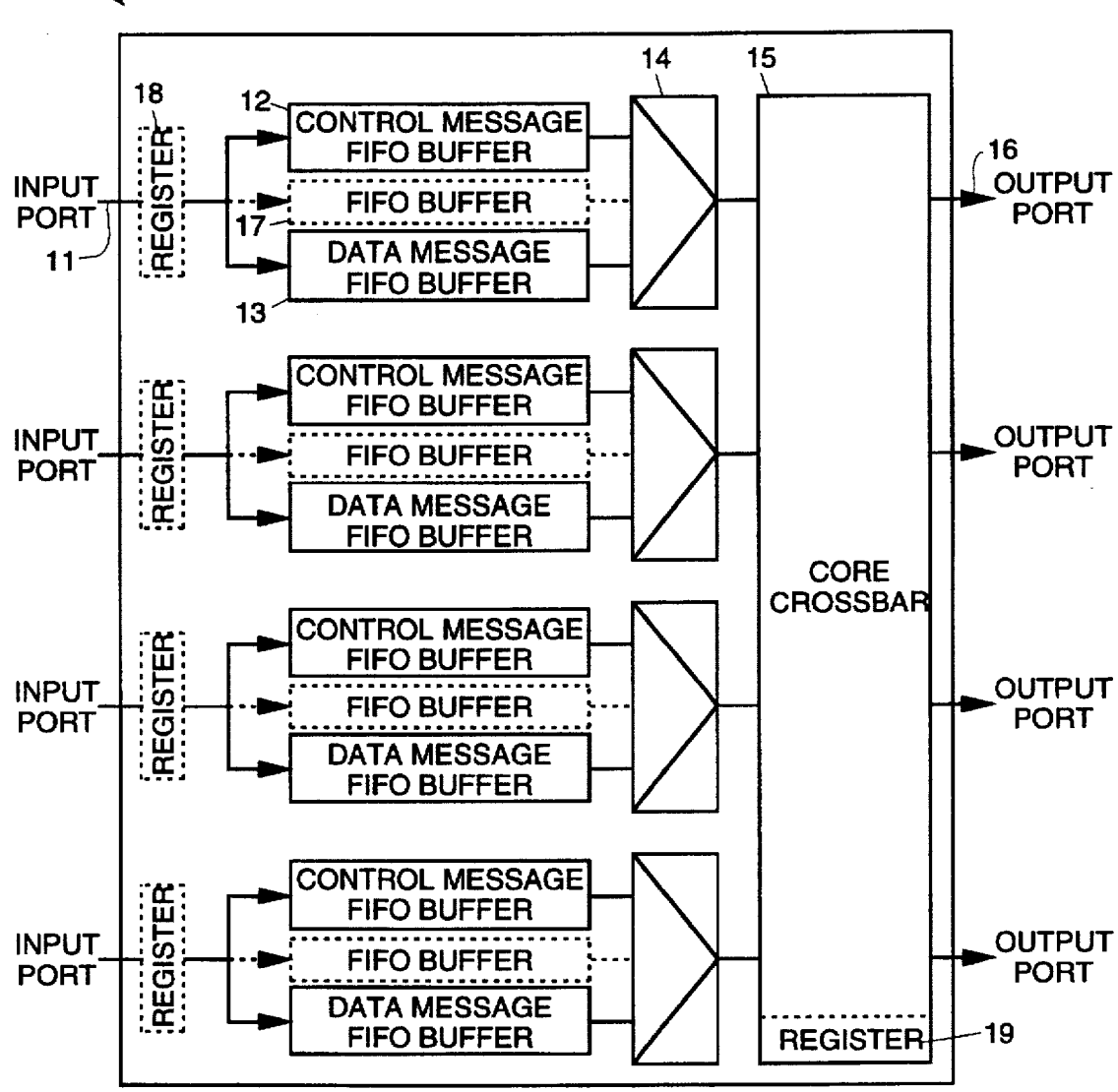
FIG. 2 shows a data and control message network or switch in accordance with the principles of the present invention.

FIG. 2 shows details of the data and control message switch 10 of the present invention. FIG. 2 illustrates a simple four-by-four switch 10 which is provided for illustrative purposes and should not be taken as limiting the present invention. The switch 10 comprises a plurality of input ports 11, each of which is coupled to a control message first-in, first-out (FIFO) buffer 12 and to a data message first-in, first-out (FIFO) buffer 13. Outputs of each set of control and data FIFO buffers 12, 13 are coupled through a multiplexer 14 to a core crossbar switch 15. The core crossbar switch 15 is coupled to a plurality of output ports 16 of the switch 10.

In order to use substantially the same crossbar implementation for both the control and data messages, the output of the control message FIFO buffer 12 and the data message FIFO buffer 13 at a given input port 11 are passed through the multiplexer 14 for selection of one or the other as input to the core crossbar 15. An expanded non-blocking crossbar implementation may be employed, but the benefit would be limited because each pair of FIFO buffers 12, 13 share the same link 23b.

When data is sent over a link 23c, e.g., from a first switch 10a to a second switch 10b (or from a sender 21 to a switch 10a), it is necessary to inform the receiving switch 10b whether control message words or data message words are being transmitted. Various approaches may be used to accomplish this. One approach is for the first switch 10a to send a state control word to the second switch 10b when the first switch 10a is about to begin sending a message. The state control word indicates to the second switch 10b which FIFO buffer 12, 13 to store the input words into.

A second approach is to have an additional Message Type control line on each link 23, to indicate whether a control message or a data message will be sent. Band-width is somewhat higher with this approach, at the cost of an extra wire per link 23.

A third approach is to place a buffer register 18 ahead of the control and data FIFO buffers 12, 13 at each input port 11. This provides time to decode the first header word, allowing the message type (control or data) to be specified in the header rather than being signaled in advance of message arrival.

If a data message has been preempted by a control message, logic comprising the data FIFO buffer 13 in the second switch 10b reverts to the state for receiving a data message after the tail of the control message arrives at the second switch 10b.

When a control message has preempted a data message at the input link 11 of a switch 10, the control message FIFO buffer 12 is selected as a source for the core crossbar 15 at the expense of the data message FIFO buffer 13. The crossbar connectivity for the output port 16 that was in use by the preempted data message need not change as a result of preemption. That output port 16 remains idle during the preemption interval unless a control message needs it.

Arrival of a control message at a switch 10 changes the crossbar state for the output port 16 needed by the control message, unless the output port 16 is already in use, transmitting another control message. The newly arrived control message preempts any data message currently using that output port 16, in which case the old crossbar state for the output port 16 is saved in a register 19 in the core crossbar 16 (the saved state is the crossbar connectivity selection for that output port 16). After the control message passes through the core crossbar 15, the crossbar state reverts so that the data message can resume.

Control signal lines may be included as part of each link 23 to signal the start and end of messages and to indicate preemption. An alternative approach is to signal the start and end of a message by means of state control words passed from a sending switch 10a to a receiving switch 10b. State control words are distinguished from message data words using a Word Type signal line. The state control word that signals the initiation of a message may also include information specifying whether the message is a control message or data message. Receipt of a message initiation state control word in the middle of a data message signifies preemption. There is extra message overhead with this approach, due to the additional control words. With the first of these two approaches, using control signal lines rather than state control words, network interface logic at a processing node 21, 22 is simpler, but one or two extra control lines are required (including the Message Type signal line).

Link bandwidth is maximized by using a high clock rate. The design allows multiple words to be in transit down a link 23. A word can be issued by a sender 21 before the previous word(s) is received at the other end of the link 23. For this reason, FIFO buffers 12, 13 are used at the receiving end; multiple words are accepted after the flow control signal commands the sender 21 to cease transmitting, due to transmission time lag. The clock signal may be sent along with the data, or other self-clocking schemes may be employed. A second reason for using the FIFO buffers 12, 13 at input ports 11 of the switch 10 is to accommodate clock misalignment between the input port 11 and internal logic of the switch 10.

The approach of the present invention may be extended to allow additional priority levels. Using this extension, every input port 11 has an additional input FIFO buffer 17 for each priority level. Rather than specifying the message type, a message header provides the priority level. On arrival of a new message at an input port 11, if the output port 16 that the new message needs is currently assigned to a lower priority message, the lower priority message is preempted. To accommodate multiple levels of preemption, previous state information is stored on a register stack in the register 19.

Processing units made up of many individual computers are employed in various avionics and missile control systems. Using the present integrated control and data communication network 10 in these types of systems reduces costs by eliminating the need for a separate control bus and its associated software.

Thus, an improved control and data message network has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A switch for communicating control messages and data messages, said switch comprising:
    a plurality of input ports;
    a plurality of control message first-in, first-out buffers, each of which is coupled to a selected one of the input ports;
    a plurality of data message first-in, first-out buffers, each of which is coupled to a selected one of the input ports;
    a plurality of multiplexers, each of which is coupled to a selected one of the control message buffers and a selected one of the data message buffers;
    a core crossbar switch coupled to the plurality of multiplexers; and
    a plurality of output ports coupled to the core crossbar switch.

2. The switch of claim 1 further comprising an additional first-in, first-out buffer coupled between a respective input port and a respective multiplexer.

3. The switch of claim 1 further comprising an input register coupled between a respective input port and the first-in, first-out buffers.

4. The switch of claim 1 further comprising a register for storing crossbar states for output ports of the core crossbar.

* * * * *